US012671077B2

(12) United States Patent
Straub et al.

(10) Patent No.: US 12,671,077 B2
(45) Date of Patent: Jun. 30, 2026

(54) ELECTRODE, USE THEREOF, BATTERY, AND PROCESS FOR PRODUCING AN ELECTRODE

(71) Applicant: RENA Technologies GmbH, Gütenbach (DE)

(72) Inventors: Benedikt Straub, Gütenbach (DE); John Burschik, Gütenbach (DE)

(73) Assignee: RENA Technologies GmbH, Gütenbach (DE)

( * ) Notice: Subject to any disclaimer, the term of this patent is extended or adjusted under 35 U.S.C. 154(b) by 737 days.

(21) Appl. No.: 17/799,135

(22) PCT Filed: Feb. 11, 2021

(86) PCT No.: PCT/DE2021/100137
§ 371 (c)(1),
(2) Date: Aug. 11, 2022

(87) PCT Pub. No.: WO2021/160222
PCT Pub. Date: Aug. 19, 2021

(65) Prior Publication Data
US 2023/0077095 A1    Mar. 9, 2023

(30) Foreign Application Priority Data
Feb. 11, 2020    (DE) ..................... 10 2020 103 531.4

(51) Int. Cl.
*H01M 4/1395* (2010.01)
*C25D 3/12* (2006.01)
(Continued)

(52) U.S. Cl.
CPC ............ *H01M 4/1395* (2013.01); *C25D 3/12* (2013.01); *C25D 3/38* (2013.01); *C25D 5/10* (2013.01);
(Continued)

(58) Field of Classification Search
CPC ........ H01M 4/1395; H01M 4/13; H01M 4/04; H01M 4/0404; H01M 4/0471
See application file for complete search history.

(56) References Cited

U.S. PATENT DOCUMENTS 6,391,145 B1 * 5/2002 Nishimoto ............ H10F 77/703
257/E31.13
8,759,120 B2 6/2014 Becker et al.
(Continued)

FOREIGN PATENT DOCUMENTS

CN        103313937 A      9/2013
DE     102009008152 A1     8/2010
(Continued)

OTHER PUBLICATIONS

Hua Cheng et al, "Periodic porous silicon thin films with interconnected channels as durable anode materials for lithium ion batteries", Materials Chemistry and Physics, Elsevier SA, Switzerland, Taiwan, Republic of China, Band 144, No. 1, Jan. 7, 2014 (Jan. 7, 2014), pp. 25-30, XP028829159, DOI: 10.1016/J.MATCHEMPHYS. 2013.12.003, ISSN:0254-0584, Summary, p. 26, Paragraph 4-p. 29, paragraph 3; Figures 1-5b.

(Continued)

*Primary Examiner* — Kenneth J Douyette
(74) *Attorney, Agent, or Firm* — Laurence A. Greenberg; Werner H. Stemer; Ralph E. Locher

(57) ABSTRACT

An electrode for a lithium-ion battery. The electrode has at least one porous silicon layer and a copper layer. There is also described a battery with such an electrode, a method for producing an electrode of this kind, and the use of an electrode of this kind in a battery.

18 Claims, 8 Drawing Sheets

(51) Int. Cl.

| | |
|---|---|
| *C25D 3/38* | (2006.01) |
| *C25D 5/10* | (2006.01) |
| *C25D 5/12* | (2006.01) |
| *C25F 3/12* | (2006.01) |
| *H01M 4/04* | (2006.01) |
| *H01M 4/134* | (2010.01) |
| *H01M 4/36* | (2006.01) |
| *H01M 4/38* | (2006.01) |
| *H01M 4/02* | (2006.01) |

(52) U.S. Cl.

CPC .................. *C25D 5/12* (2013.01); *C25F 3/12* (2013.01); *H01M 4/0402* (2013.01); *H01M 4/044* (2013.01); *H01M 4/045* (2013.01); *H01M 4/0471* (2013.01); *H01M 4/0492* (2013.01); *H01M 4/134* (2013.01); *H01M 4/366* (2013.01); *H01M 4/386* (2013.01); *H01M 2004/027* (2013.01)

(56) References Cited

U.S. PATENT DOCUMENTS

| | | | |
|---|---|---|---|
| 9,716,276 B2 | 7/2017 | Bahr et al. | |
| 9,871,248 B2 | 1/2018 | Rayner et al. | |
| 11,264,680 B2 | 3/2022 | Busacca et al. | |
| 2003/0118897 A1* | 6/2003 | Mino ...................... | H01L 23/58 |
| | | | 429/149 |
| 2009/0230915 A1* | 9/2009 | Roozeboom ........ | H01M 10/058 |
| | | | 29/623.5 |
| 2010/0219535 A1* | 9/2010 | Kutzer ................... | H10F 71/00 |
| | | | 257/E21.59 |
| 2011/0318872 A1* | 12/2011 | Becker .................. | H10F 77/211 |
| | | | 257/E31.124 |
| 2012/0231326 A1 | 9/2012 | Biswal et al. | |
| 2013/0078513 A1 | 3/2013 | Nathan | |
| 2014/0050969 A1 | 2/2014 | Rust, III et al. | |
| 2014/0178728 A1 | 6/2014 | Nalamasu et al. | |
| 2015/0364754 A1 | 12/2015 | Egerton et al. | |
| 2017/0084482 A1 | 3/2017 | Ory | |
| 2020/0044100 A1 | 2/2020 | Straub et al. | |

FOREIGN PATENT DOCUMENTS

| | | |
|---|---|---|
| DE | 102009035745 A1 | 2/2011 |
| DE | 102015120879 A1 | 6/2017 |
| JP | 2012519367 A | 8/2012 |
| JP | 2013509687 A | 3/2013 |
| JP | 2015524994 A | 8/2015 |
| KR | 1020120093895 A | 8/2012 |
| TW | 201929309 A | 7/2019 |
| WO | 2012162071 A1 | 11/2012 |
| WO | 2018145699 A2 | 8/2018 |
| WO | 2020008285 A1 | 1/2020 |

OTHER PUBLICATIONS

Rolf Brendel et al, "Textured monocrystalline thin-film Si cells from the porous silicon (PSI) process", May 24, 2001 (May 24, 2001), vol. 9, No. 3, pp. 217-221, XP002689724, DOI: 10.1002/PIP.377, ISSN: 1062-7995 [found on May 24, 2001], Summary, p. 217, paragraph Introduction-p. 219, paragraph Device characterization; Figures 1, 2.

* cited by examiner

ELECTRODE, USE THEREOF, BATTERY, AND PROCESS FOR PRODUCING AN ELECTRODE

FIELD AND BACKGROUND OF THE INVENTION

The invention relates to an electrode, especially for a lithium-ion battery, and to the use thereof. In addition, the invention relates to a battery and to a process for producing an electrode.

Lithium-ion batteries are a type of battery in widespread use and are used in a multitude of devices, especially in mobile devices or in electric vehicles.

In lithium-ion batteries, an electrode that comprises graphite is often used as the anode. Such an electrode, on account of the relatively low lithium-uptake capacity of graphite, has only a limited specific charging capacity of up to 500 mAh/g.

An alternative to graphite as electrode material is silicon. With a silicon-based electrode it is theoretically possible to achieve a specific charging capacity of 4200 mAh/g. However, silicon has the disadvantage compared to graphite that intercalation of lithium results in a substantial expansion in volume of the silicon. If a silicon-based electrode is used in a lithium-ion battery, the substantial expansion in volume of the silicon can after a few charge cycles result in destruction of the battery.

SUMMARY OF THE INVENTION

An object of the invention is to provide an electrode that is able to achieve a high specific charging capacity and a long service life, and also to specify a process for producing such an electrode.

As regards the electrode, the invention achieves this object by an electrode as claimed. As regards the process, the invention achieves this object by a process as claimed.

A further object of the invention is to provide a battery that is able to achieve a high specific charging capacity and a long service life.

The invention achieves this object respectively by the use as claimed and by the battery as claimed.

Preferred further developments of the invention are the subject of the further patent claims.

The electrode of the invention has at least one porous silicon layer and one copper layer.

Through the use of silicon as electrode material it is possible to achieve a high specific charging capacity, this being a consequence in particular of the high lithium-uptake capacity of silicon compared to the lithium-uptake capacity of graphite.

In the event of an expansion in volume, for example as a result of intercalation of lithium, the pores in the at least one silicon layer allow the silicon to expand into the cavities formed by the pores. This permits the silicon to withstand the expansion in volume undamaged, thus making it possible for the electrode to achieve a long service life.

In addition, the at least one porous silicon layer can be produced at low cost. It is for example possible during production to dispense with a masking step and/or a multi-stage etching process. The ability to produce the at least one porous silicon layer at low cost advantageously makes it possible to produce the entire electrode at low cost.

The at least one porous silicon layer takes the form preferably of a sponge-like structure. The pores of the at least one porous silicon layer advantageously have a pore size of at least 10 nm. This makes it possible to provide the silicon with cavities sufficiently large to withstand an expansion in volume undamaged. It is further advantageous when the pores have a pore size of not more than 10 000 nm, particularly since larger pores can potentially have a disadvantageous effect on the stability of the at least one porous silicon layer.

In addition, the at least one porous silicon layer may be at least partly embedded in the copper layer. That is to say, the copper layer may be formed such that it extends into at least some of the pores of the at least one porous silicon layer.

In a preferred manner, the copper layer is arranged on the at least one porous silicon layer, in particular directly on the at least one porous silicon layer.

It is advantageous when the copper layer has a layer thickness of at least 1 μm, preferably at least 2 μm. It is advantageous for the production process when the copper layer has such a minimum layer thickness, especially since such a minimum layer thickness in the copper layer makes it easier to remove from a silicon substrate the copper layer together with the at least one porous silicon layer. It is also advantageous when the layer thickness of the copper layer is not more than 20 μm, preferably not more than 12 μm, especially since a layer thickness of more than 20 μm in the copper layer can potentially be disadvantageous for the mechanical flexibility of the electrode.

In an advantageous further development of the invention, the electrode comprises a multilayer system made up of a plurality of porous silicon layers, preferably arranged on top of one another, the at least one porous silicon layer being one of these layers. Said layers may differ from one another, for example in that the porous silicon layers each have different porosities and/or different pore sizes and/or different pore shapes.

When the electrode comprises such a multilayer system, the copper layer of the electrode is preferably arranged on one of the porous silicon layers of the multilayer system, in particular directly on one of the porous silicon layers of the multilayer system.

It is advantageous when the electrode is designed as a film, especially as a rollable film. Designing the electrode in the form of a rollable film makes it possible, for example, to use the electrode in the rolled-up state in a battery having a cylindrical construction. As an alternative or in addition, the film may be foldable. This makes it possible to realize an electrode with a construction that has for example a rectangular base.

In a preferred embodiment of the invention, lithium is intercalated in the at least one porous silicon layer of the electrode. When the electrode has a multilayer system made up of a plurality of porous silicon layers, lithium may be intercalated in more than one, especially all, of the porous silicon layers of the multilayer system.

The process of the invention for producing the electrode of the invention comprises the following process steps:

forming at least one porous silicon layer by etching of a silicon substrate;

depositing a copper layer on the at least one porous silicon layer.

For the purposes of forming the at least one porous silicon layer, the silicon substrate may be etched for example wet-chemically. That is to say, the etching of the silicon substrate may especially be wet-chemical etching.

The etching of the silicon substrate for the purposes of forming the at least one porous silicon layer may in principle take place in what is known as a batch process, for example by etching the silicon substrate in an immersion bath. In an advantageous embodiment of the invention, the etching for the purposes of forming the at least one porous silicon layer takes place in a continuous process that makes it possible, for example, to produce a large number of electrodes of the invention in a short space of time and at low cost.

In a preferred manner, the silicon substrate is for the purposes of forming the at least one porous silicon layer etched on one side. For example, it may be the case that only the underside of the silicon substrate is etched.

An advantageous embodiment of the invention is when, for the purposes of forming the at least one porous silicon layer, the silicon substrate is etched electrochemically.

The silicon substrate may for example be transported along a direction of transport through a plurality of treatment tanks arranged one after the other in the direction of transport that are each filled with an etching medium and in each of which is arranged an electrode. During transport through the treatment tanks, the silicon substrate is preferably contacted on the substrate underside with the etching medium present in the respective treatment tank. It is further advantageous when the polarity of the electrodes arranged in the treatment tanks alternates in the direction of transport.

The feature of the polarity of the electrodes arranged in the treatment tanks alternating in the direction of transport can be understood as meaning that a positively charged electrode is in the direction of transport followed by a negatively charged electrode and that a negatively charged electrode is in the direction of transport followed by a positively charged electrode, such a polarity switch being repeated accordingly when there are more than three successive treatment tanks in the direction of transport. The analogous situation applies when the first electrode is a negatively charged electrode.

Between two treatment tanks may be arranged in each case a gas nozzle, by means of which a gas or gas mixture, for example air, is blown onto the underside of the substrate in order to remove etching medium present on the underside of the substrate. The gas nozzle may especially take the form of what is known as an air knife. It is preferable that an inert gas or a protective gas, especially nitrogen, is blown onto the underside of the substrate by means of the gas nozzle. This makes it possible to avoid increased oxidation of the substrate and an associated greater risk of fracture.

In the case of electrochemical etching, an electric current density of preferably at least 0.5 mA/cm², especially at least 1 mA/cm², is applied to the silicon substrate. It is further preferable that the electric current density applied to the silicon substrate during electrochemical etching is not more than 200 mA/cm², especially not more than 120 mA/cm².

The etching medium with which the treatment tanks are filled comprises preferably hydrogen fluoride. The etching medium may especially be an aqueous hydrogen fluoride solution. Optionally, the etching medium may comprise a surfactant and/or an additive.

In addition, the etching may for the purposes of forming the at least one porous silicon layer be executed especially in the form of a metal-catalyzed chemical etching process (known in specialist circles also as "metal-assisted etching").

The deposition of the copper layer on the at least one porous silicon layer may be effected in different ways. For example, the copper layer may be deposited on the at least one porous silicon layer by sputtering of a copper target by ions (also known as "ion sputtering"). Alternatively, the copper layer may for example be deposited by applying a copper paste on the at least one porous silicon layer by means of screen-printing and/or a rolling process. It is also possible to deposit the copper layer on the at least one porous silicon layer by a chemical deposition process.

The copper layer may especially be deposited in a two-stage process. For example, a first portion of the copper layer may in a first deposition step be deposited on the at least one porous silicon layer by means of galvanic displacement. In a second deposition step, a second portion of the copper layer may then be deposited on the first portion of the copper layer by means of electrochemical deposition. A two-step process of this kind allows a homogeneous and robust copper layer to be formed. The first deposition step makes it possible in particular to avoid the formation of copper islands during electrochemical deposition, which can develop as a consequence of the high electrical resistance of the at least one porous silicon layer or of the multilayer system and would result in an inhomogeneous copper layer. The deposition step in each case may be realized as a batch process or as a continuous process.

In an alternative process variant, a nickel layer is in a first deposition step deposited on the at least one porous silicon layer. This is then followed in a second deposition step by the deposition of the copper layer on the nickel layer. The nickel layer makes it possible to achieve improved adhesion on the silicon layer of the copper layer that follows the nickel layer. The deposition of the nickel layer in the first deposition step on the at least one porous silicon layer may be effected according to a process already described above in connection with the deposition of the copper layer on the at least one porous silicon layer. Preferably, the nickel layer is deposited on the at least one porous silicon layer by means of electrochemical deposition. In the electrochemical deposition of the nickel layer on the silicon substrate, an electric current density of preferably at least 0.5 mA/cm², especially an electric current density of at least 10 mA/cm², is applied to the silicon substrate. For the purposes of forming the nickel layer, it is here advantageous to apply an electric current density of not more than 150 mA/cm², preferably of not more than 100 mA/cm². In addition, it has been found to be advantageous when the nickel layer has a layer thickness of at least 0.1 μm, preferably of at least 0.5 μm. It is further advantageous when the layer thickness of the nickel layer is not more than 3 μm, preferably not more than 1.5 μm. In the second deposition step, the copper layer can be deposited on the nickel layer by means of electrochemical deposition. The deposition step in each case may be realized as a batch process or as a continuous process.

Galvanic displacement is a self-limiting process. This advantageously has the result that the first portion of the copper layer or the nickel layer has only a thin layer thickness of a few hundred nanometers. The first portion of the copper layer or the nickel layer can in particular serve as an electrically conductive seed layer, i.e. as a conductive base for the formation of the second portion of the copper layer that is deposited in the second deposition step by means of electrochemical deposition.

In the galvanic displacement, i.e. in the first deposition step, the silicon substrate is preferably contacted with a deposition solution, especially an aqueous deposition solution. The deposition solution may, in the case of deposition of the first portion of the copper layer, comprise for example copper sulfate and, in the case of deposition of the nickel layer, comprise for example nickel sulfate or nickel sulfamate. The deposition solution may additionally comprise hydrogen fluoride. Optionally, the deposition solution may comprise an additive, especially an organic additive for better wetting of the surface of the silicon substrate, for adjusting the pH and/or for homogenizing the deposition solution.

In the electrochemical deposition, i.e. in the second deposition step, the silicon substrate is advantageously wetted with a deposition solution. This comprises preferably copper sulfate. In addition, it is advantageous when an electric current is applied between the silicon substrate and the latter deposition solution.

Preferably, an electric current density of at least 0.5 mA/cm$^2$, especially at least 1 mA/cm$^2$, is in the electrochemical deposition applied to the first portion of the copper sulfate deposited on the silicon substrate for the purposes of the deposition of the second portion of the copper layer. It is further preferable when an electric current density of not more than 150 mA/cm$^2$, especially not more than 100 mA/cm$^2$, is applied to the first portion of the copper sulfate deposited on the silicon substrate for the purposes of forming the second portion of the copper layer. In the design variant described above in which the copper layer is deposited on the nickel layer, the stated current densities may be applied to the nickel layer for the purposes of depositing the copper layer.

The electric current density applied to the first portion of the copper layer or the nickel layer for the purposes of depositing the second portion of the copper layer or of the copper layer can be adjusted such that the electric current density is constant over time. Alternatively, the electric current density can be adjusted such that the electric current density increases according to a specified ramp or alternates over time. The latter permits the deposition of the second portion of the copper layer, or of the copper layer on the nickel layer, with an increasing or alternating rate of deposition, in order to achieve for example better homogeneity in the copper layer.

In a preferred further development of the invention, etching of the silicon substrate results in the formation of a multilayer system made up of a plurality of porous silicon layers, wherein the at least one porous silicon layer is one of the plurality of porous silicon layers of the multilayer system. The porous silicon layers may differ from one another, for example, in that the porous silicon layers each have different porosities and/or different pore sizes and/or different pore shapes.

The individual porous silicon layers of the multilayer system may have different functions. One of the silicon layers of the multilayer system may for example be intended to be a detachment layer. One or more silicon layers of the multilayer system may for example serve for the intercalation of lithium. In turn, another of the silicon layers of the multilayer system may be intended to be a barrier layer for the copper layer that is to be deposited.

It is particularly advantageous when the multilayer system is formed such that the porous silicon layer of the multilayer system having the greatest porosity immediately adjoins an unporosified portion of the silicon substrate. The porous silicon layer of the multilayer system having the greatest porosity serves preferably as a detachment layer, i.e. as a layer that serves for the detachment of at least a portion of the multilayer system from the unporosified portion of the silicon substrate.

The at least one porous silicon layer is advantageously removed together with the copper layer from an unporosified portion of the silicon substrate.

When the multilayer system is formed from a plurality of porous silicon layers, it is advantageous when a plurality of layers, especially all layers, of the multilayer system are removed together with the copper layer from the unporosified portion of the silicon substrate.

For the purposes of the removal together of the at least one porous silicon layer and the copper layer, the silicon substrate is preferably subjected to a thermal treatment. The thermal treatment may be for example by means of an oven, especially by means of a continuous oven.

The thermal treatment can for example bring about the collapse of at least some of the pore walls of the at least one porous silicon layer and/or possibly of at least some of the pore walls of one of the other porous silicon layers of the multilayer system, especially of the pore walls of the porous silicon layer having the greatest porosity, with the result that it is possible to inexpensively remove the at least one porous silicon layer together with the copper layer from the unporosified portion of the silicon substrate.

In the thermal treatment, a temperature gradient is advantageously created between the silicon substrate and its surroundings. The temperature gradient may be created in different ways, for example by hotplates and/or by infrared lamps and/or by recirculation heating and/or by induction heating.

In a preferred manner, the temperature gradient is at least 20° C., especially at least 30° C. In addition, it is expedient when the temperature of the silicon substrate in the thermal treatment is maintained below the melting temperature of silicon, in order to avoid in particular the destruction of the porous structure of the at least one porous silicon layer.

For the purposes of the removal together of the at least one porous silicon layer and the copper layer, it is in principle possible to employ instead of a thermal treatment a different method, especially a mechanical method of removal.

In a preferred further development of the invention, lithium is intercalated in the at least one porous silicon layer. When the multilayer system is formed from a plurality of porous silicon layers, lithium may in particular be intercalated in more than one or all of the porous silicon layers of the multilayer system.

The lithium may be intercalated in elemental form, for example in the form of lithium clusters, and/or as part of a chemical compound, for example in the form of a lithium-silicon mixed crystal.

The intercalation of the lithium preferably takes place after the at least one porous silicon layer and any other porous silicon layers present have been removed together with the copper layer from the unporosified portion of the silicon substrate.

After the removal together of the at least one porous silicon layer and of the copper layer from the unporosified portion of the silicon substrate, any metal residues, such as copper residues or nickel residues, and/or any remnants of porous structures, for example projecting stumps may be removed from the remaining silicon substrate. This allows the remaining silicon substrate to be recycled. For example, the remaining silicon substrate may, after removal of any metal residues, such as copper residues or nickel residues, and/or of any remnants of porous structures, be used for production of a further electrode, especially through repetition of the steps described above.

The removal of any remnants of porous structures and/or of any metal residues, such as copper residues or nickel residues, may be effected for example by means of a wet-chemical etching process, which may be executed especially as a batch process or as a continuous process.

If it is necessary to remove remnants of porous structures as well as metal residues such as copper residues or nickel residues, they should preferably be removed by means of a two-stage etching process in which the remaining silicon substrate is treated in a first treatment tank filled with etching medium and then in a second treatment tank filled with a different etching medium. In a preferred manner, the metal residues, such as copper residues or nickel residues, are removed in a first step and the remnants of porous structures removed in a second step.

For the removal of metal residues, such as copper residues or nickel residues, an acidic etching medium is preferably used. This may comprise for example hydrogen fluoride and/or hydrogen chloride and/or nitric acid and/or sulfuric acid and/or an oxidant, for example hydrogen peroxide and/or ozone.

For the removal of remnants of porous structures, an alkaline etching medium or an acidic etching medium may be used. The former may comprise for example sodium hydroxide and/or potassium hydroxide. The latter may comprise for example hydrogen fluoride and/or nitric acid and/or sulfuric acid.

As an alternative or in addition, the removal of any remnants of porous structures and/or of any metal residues, such as copper residues or nickel residues, may be effected in a different manner, for example by mechanical grinding and/or polishing and/or plasma etching and/or laser ablation.

As mentioned in the introduction, the invention relates inter alia to the use of the electrode and to a battery.

In the use according to the invention of the electrode of the invention, the electrode is intended to be used as an anode, preferably in a battery. Particularly advantageously, the electrode may be used as an anode in a lithium-ion battery.

The installation of the electrode in a battery is preferably followed by activation of the electrode, for example by performing a plurality of charge-discharge cycles on the battery. The charge-discharge cycles may especially be performed in accordance with one or more specified current-voltage curves. The activation of the electrode makes it possible, especially as a consequence of a self-organized recrystallization of the silicon, for an island structure to form in the at least one porous silicon layer that does not develop further after a few cycles and remains largely stable over further cycles. If the at least one silicon layer of the electrode were non-porous, the electrode would be destroyed during performance of the charge-discharge cycles.

As an alternative or in addition to the formation of an island structure through activation of the electrode, a process step of structuring of the electrode may be performed before installation of the electrode in a battery. The structuring of the electrode may for example be effected in the form of mechanical structuring by means of a negative mold, especially a mask, roller and/or cylinder, and/or in the form of laser structuring.

The battery of the invention is equipped with the electrode of the invention. Preferably, the battery is a lithium-ion battery.

In an advantageous design variant, said electrode is formed as a rollable film. A rollable film may be formed from a multiplicity of sections that are welded or bonded together. The electrode may be rolled or wound about an axis together with further components of the battery, for example a further electrode and/or a separator. The further components of the battery may here likewise be formed as rollable films. This makes it possible to realize a battery having a cylindrical construction.

Alternatively, the battery may be equipped with a folded electrode. A folding technique may be employed to fold the further components of the battery between the electrode to form a stack. The further components of the battery may here be formed as individual sections and/or as foldable films. When the further components of the battery are designed as foldable films, these may be folded by means of a Z-folding technique into a stack in which they alternate with the film-form electrode. In a Z-folding technique, folding can take place any number of times, but at least twice, each time in a direction opposite to the previous folding direction. There is thus a multitude of embodiment options for the construction of the battery, for example a cuboidal construction. It is also possible for the battery to have a stacking arrangement, in particular a cuboidal stacking arrangement, in which sections, in particular rectangular sections, of the electrode and of the further components of the battery are each stacked separately from one another.

The invention is elucidated in more detail hereinbelow with reference to figures relating to a preferred working example of the invention. Where appropriate, identical elements or elements having the same function are given the same reference numeral. The invention is not limited to the designs depicted in the figures, including in respect of functional features. The description up to now and the figure descriptions that follow contain numerous features that in some cases are combined into more than one in the dependent claims. Those skilled in the art will however also consider these features individually and combine them into useful further combinations. More particularly, these features may each be combined individually and in any suitable combination with the electrode of the invention and/or process of the invention and/or use according to the invention and/or battery of the invention.

The figures are schematic drawings and are not to scale.

DETAILED DESCRIPTION OF THE INVENTION

Figure 1:
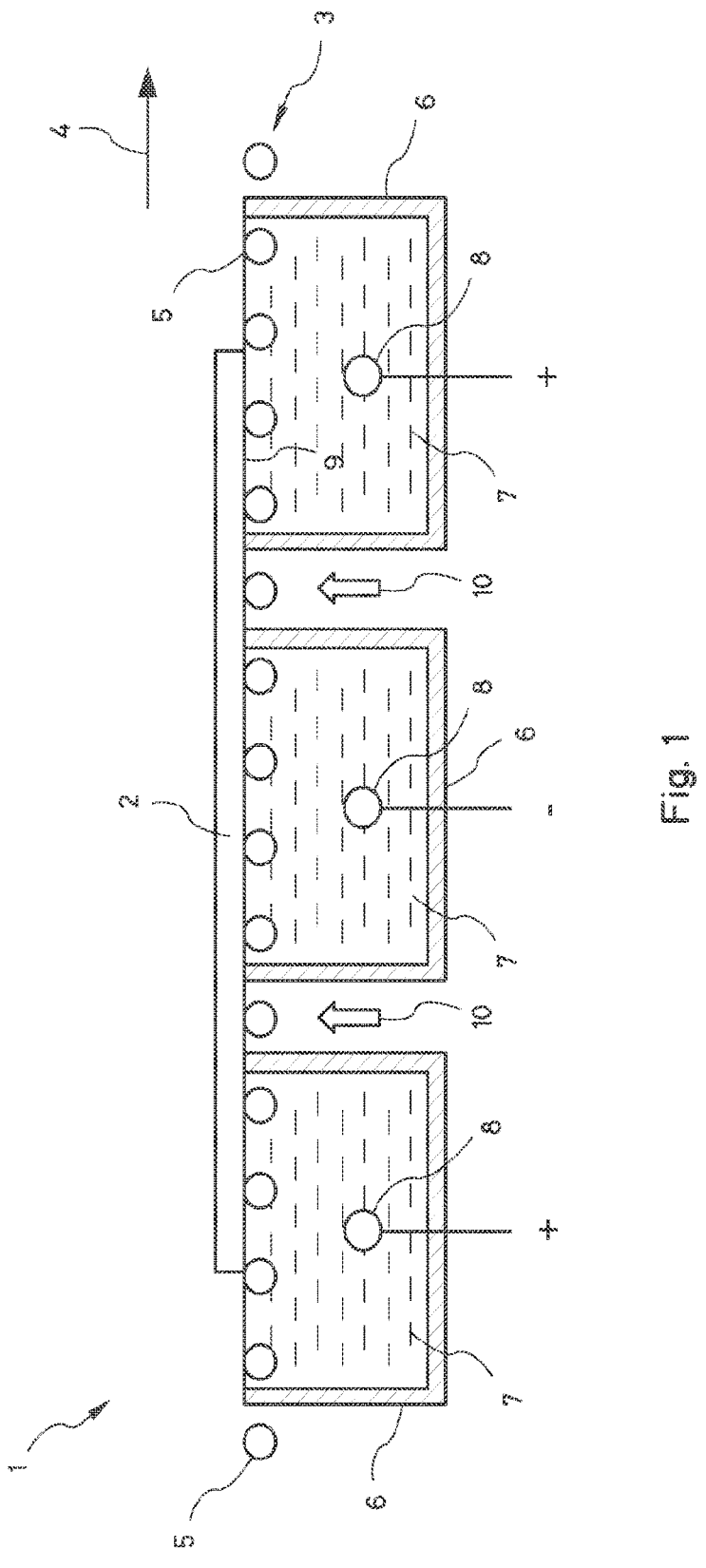
FIG. 1 shows a treatment device for the treatment of a substrate.

FIG. 1 shows a treatment device 1 for the treatment of a substrate, especially for the electrochemical etching of a substrate on one side. In addition, FIG. 1 shows a silicon substrate 2 to be treated by means of the treatment device 1.

The treatment device 1 comprises a transport device 3 that is set up to transport the silicon substrate 2 to be treated along a direction of transport 4. In the present working example, the transport device 3 takes the form of a roller conveyor having a plurality of transport rollers 5.

The treatment device 1 further comprises a plurality of treatment tanks 6 arranged one after the other in the direction of transport 4, which are each filled with an etching medium 7 and in each of which is arranged an electrode 8. In FIG. 1, three treatment tanks 6 are depicted by way of example. The treatment device 1 may in principle have a larger or a smaller number of treatment tanks 6.

The etching medium 7 is preferably an aqueous hydrogen fluoride solution. Optionally, the etching medium 7 may comprise an additive and/or a surfactant. Each of the electrodes 8 has applied to it an electrical potential, with the polarity of the electrodes 8 alternating in the direction of transport 4.

The transport device 3 transports the silicon substrate 2 along the direction of transport 4 through the treatment tanks 6, wherein the silicon substrate 2 is contacted with the etching medium 7 present in the treatment tanks 6 only on the substrate underside 9.

During transport of the silicon substrate 2 through the treatment tanks 6, an electrochemical reaction occurs in which local inhomogeneities in the electric current density cause etching peaks and troughs to arise, which on the substrate underside 9 results in the formation of pores, with the result that a porous structure forms on the substrate underside 9.

The electrochemical reaction may be regulated via the electric potential of the electrodes 8, which influences the electric current density in the treatment tanks 6. The reaction may be additionally regulated by admixing an additive and/or a surfactant.

When an etching medium comprising hydrogen fluoride is used as etching medium 7, the following reactions in particular occur on the substrate underside 9: $Si+6F^-+4h^+ \rightarrow SiF_6^{2-}$. The electric current supplies the surface of the silicon substrate 2 with electron holes ($h^+$) and the hydrogen fluoride gives rise to hydrogen fluoride ions ($F^-$) in the solution.

The electric current density on the treatment tanks 6 may be adjusted so that the porous structure of the silicon substrate 2 is graduated over the depth of the silicon substrate 2, with the result that a plurality of porous silicon layers that differ from one another in their porosity and/or in their pore size and/or in their pore shape is formed on the substrate underside 9.

Additionally present in the treatment device 1 between each treatment tank 6 is an air knife (not shown in the figures) with which is generated a gas stream 10 of nitrogen for blowing away any etching medium 7 present on the substrate underside 9.

Figure 2:
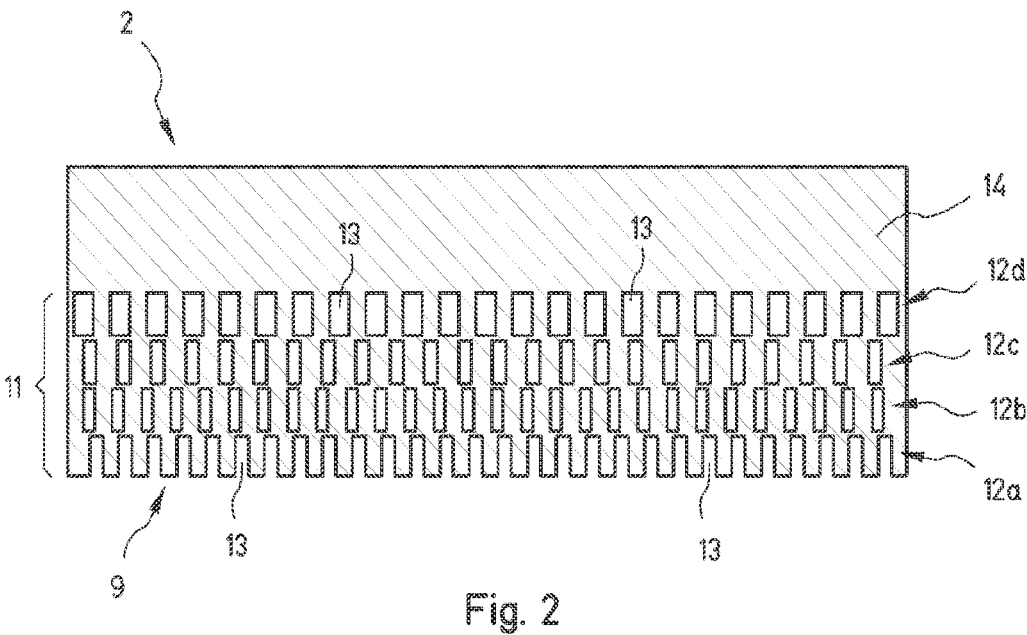
FIG. 2 shows a sectional view of a silicon substrate treated using the treatment device from FIG. 1, said substrate having a multilayer system made up of a plurality of porous silicon layers.

FIG. 2 shows, in a sectional view, the silicon substrate 2 treated with the aid of the treatment device 1 from FIG. 1.

The treated silicon substrate 2 has on the substrate underside 9 a multilayer system 11 made up of a plurality of porous silicon layers 12*a*, 12*b*, 12*c*, 12*d* arranged on top of one another. In FIG. 2, four porous silicon layers 12*a*, 12*b*, 12*c*, 12*d* are shown by way of example, it being possible in principle for a larger or smaller number of porous silicon layers to form on the substrate underside 9 of the silicon substrate 2 during treatment with the aid of the treatment device 1.

The porous silicon layers 12*a*, 12*b*, 12*c*, 12*d* differ in the size of their pores 13 and/or in the shape of their pores 13 and/or in their porosity, wherein the porous silicon layer 12*d* of the multilayer system 11 having the greatest porosity immediately adjoins an unporosified portion 14 of the silicon substrate 2. This porous silicon layer 12*d* serves as a detachment layer for the later removal of the multilayer system 11 from the unporosified portion 14 of the silicon substrate 2 (cf. FIG. 6).

Figure 3:
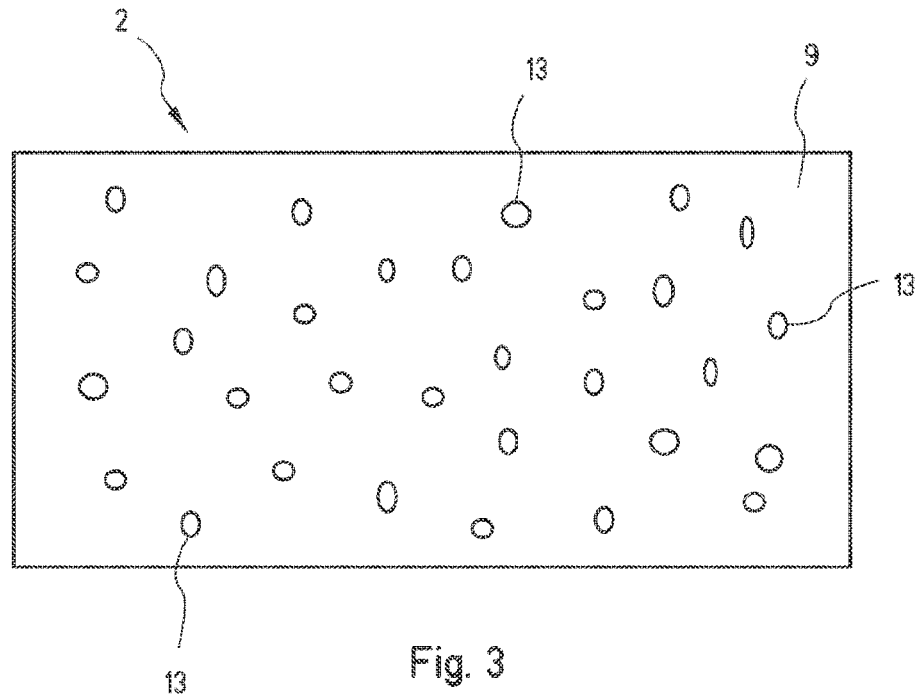
FIG. 3 shows the silicon substrate from FIG. 2 in a view from below.

FIG. 3 shows the silicon substrate 2 from FIG. 2 in a view from below.

In FIG. 3, a plurality of pores 13 of varying shape and size are visible on the substrate underside 9 of the silicon substrate 2.

Figure 4:
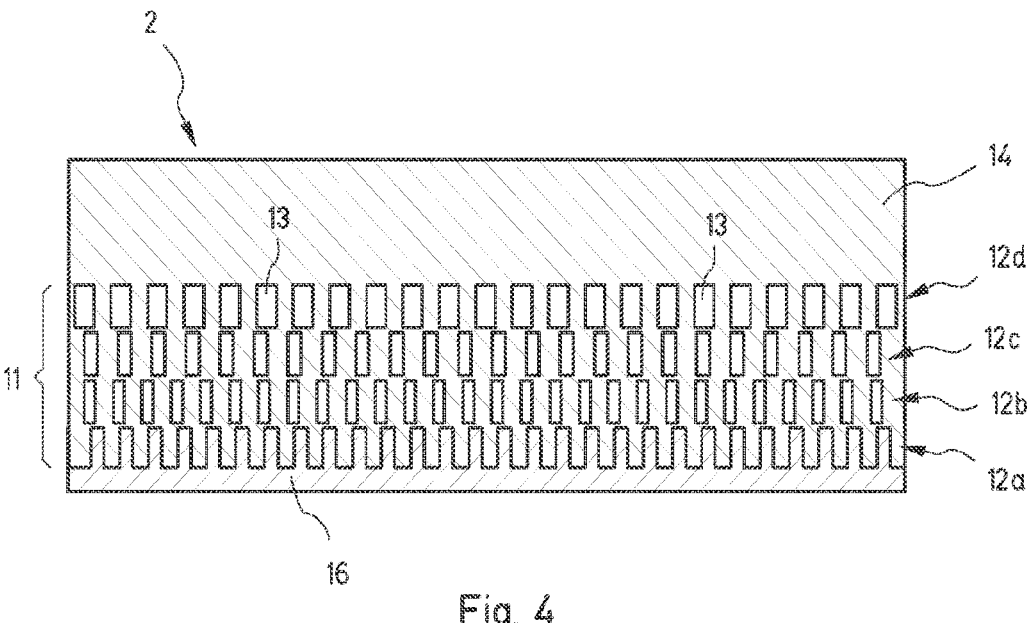
FIG. 4 shows, in a sectional view, the silicon substrate and a first portion of a copper layer deposited on the silicon substrate in a first deposition step.
Figure 5:
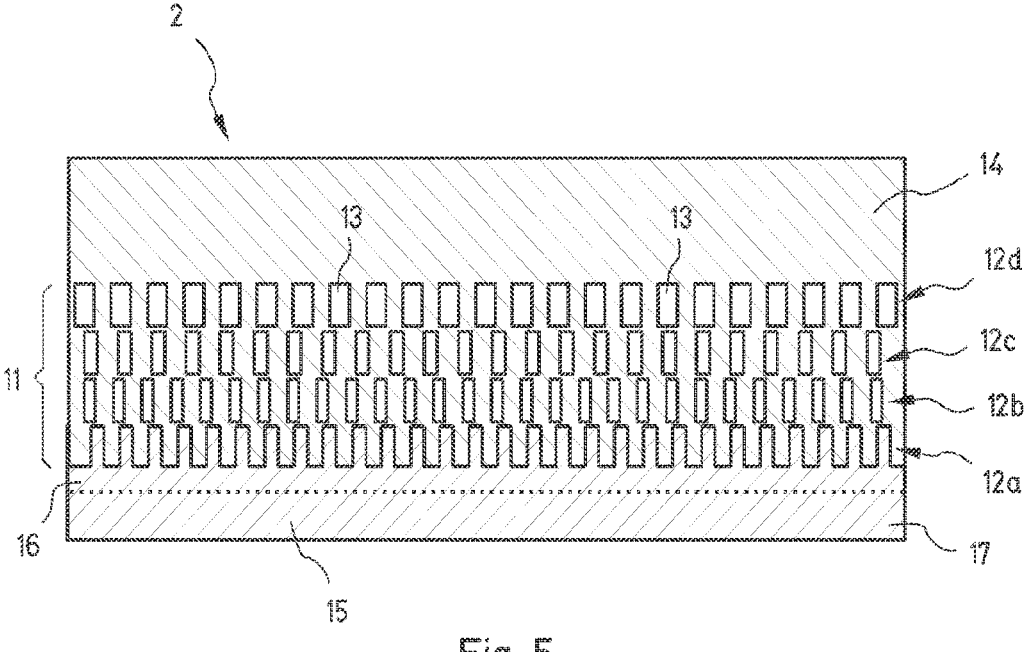
FIG. 5 shows a sectional view of the silicon substrate and of the copper layer deposited on the silicon substrate in two deposition steps.

After formation of the multilayer system 11, a copper layer 15 is deposited on the multilayer system 11 in a two-stage deposition process (cf. FIGS. 4 and 5).

In a first deposition step, a first portion 16 of the copper layer 15 is deposited on the multilayer system 11 by means of galvanic displacement. In this deposition step, the silicon substrate 2 is contacted on the substrate underside 9 with an aqueous deposition solution comprising hydrogen fluoride and copper sulfate. The hydrogen fluoride dissolves silicon dioxide from the substrate underside 9 of the silicon substrate 2, leaving behind unoxidized silicon on the substrate underside 9, which, on account of the chemical potential between silicon and copper, is very attractive for the copper ions present in the deposition solution.

Galvanic displacement is a self-limiting process that stops by itself when the extremely porous silicon layer 12*a* is completely covered with copper. At the end of the first deposition step, said first portion 16 of the copper layer 15 has formed such that the extremely porous silicon layer 12*a* is embedded in the first portion 16 of the copper layer 15.

In a second deposition step, a second portion 17 of the copper layer 15 is then deposited on the first portion 16 of the copper layer 15 by means of electrochemical deposition. The first portion 16 of the copper layer 15 serves as an electrically conductive seed layer for the formation of the second portion 17 of the copper layer 15.

In the second deposition step, the silicon substrate 2 is wetted on the substrate underside 9 with a deposition solution comprising copper sulfate and an electric current is applied. The silicon substrate 2 serves in the electrochemical deposition as a negatively charged electrode, while the deposition solution serves as a positively charged counter electrode.

FIG. 4 shows a sectional view of the silicon substrate 2 after deposition of the first portion 16 of the copper layer 15 on the multilayer system 11.

FIG. 5 shows a sectional view of the silicon substrate 2 after deposition of the second portion 17 of the copper layer 15 on the first portion 16 of the copper layer 15.

Figure 6:
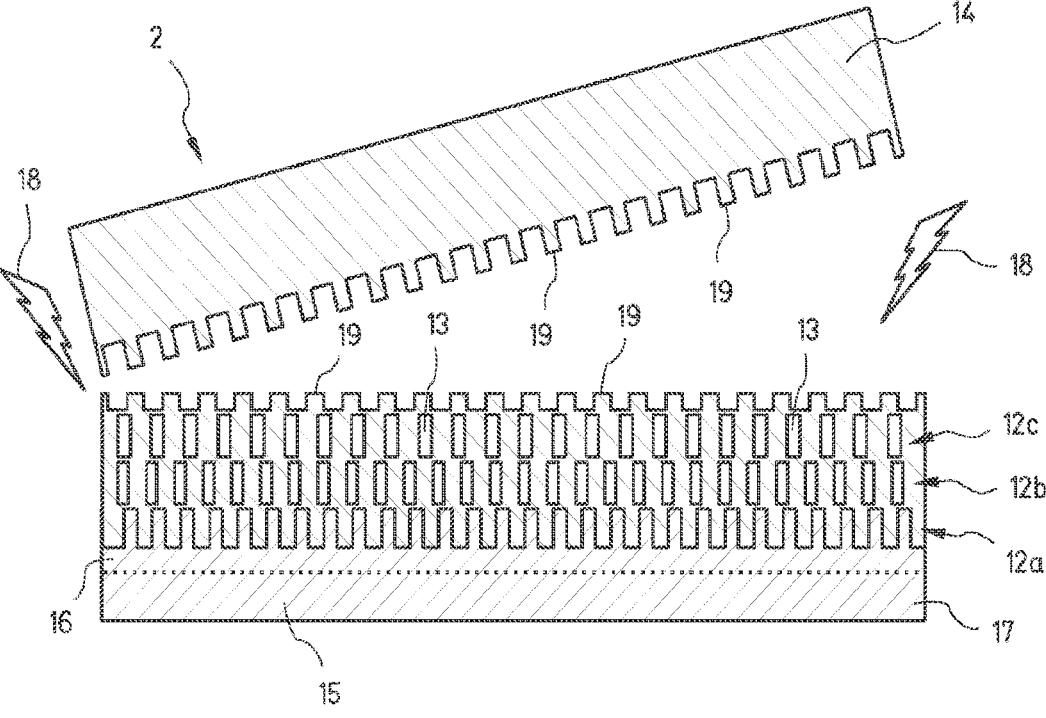
FIG. 6 shows, in a sectional view, the silicon substrate and the copper layer deposited on the silicon substrate after the removal together of the copper layer and of a plurality of porous silicon layers from an unporosified portion of the silicon substrate.

After deposition of the copper layer 15, the silicon substrate 2 is subjected to a thermal treatment (cf. FIG. 6). This may for example take place in a continuous oven (not shown in the figure).

In the thermal treatment, thermal radiation 18 is employed to bring about collapse of the pore walls of the porous silicon layer 12*d* serving as a detachment layer (cf. FIGS. 2, 4, and 5), this being attributable to differences in the thermal coefficient of expansion between porous silicon layers 12*a*, 12*b*, 12*c* on the one hand and porous silicon layer 12*d* on the other. This allows the copper layer 15 together with the porous silicon layers 12*a*, 12*b*, 12*c* of the multilayer system 11 to be detached from the unporosified portion 14 of the silicon substrate 2.

After the thermal treatment, all that remains of the porous silicon layer 12*d* serving as a detachment layer are slender stumps 19. These respectively adjoin the unporosified portion 14 of the silicon substrate 2 or the porous silicon layer 12*c* of the multilayer system 11 formerly adjoining the detachment layer.

FIG. 6 shows, in a sectional view, the silicon substrate 2 and the copper layer 15 deposited on the silicon substrate 2 after the removal together of the copper layer 15 and of the porous silicon layers 12*a*, 12*b*, 12*c* from the unporosified portion 14 of the silicon substrate 2.

Figure 7:
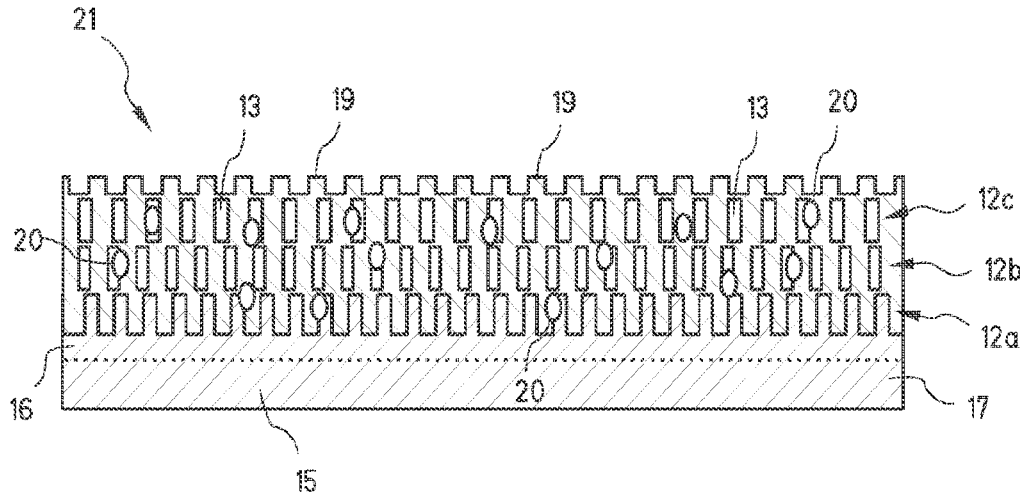
FIG. 7 shows a sectional view of an electrode for a battery, which is formed by the detached copper layer, the detached porous silicon layers, and the lithium intercalated in the porous silicon layers.

After the removal together of the copper layer 15 and of the porous silicon layers 12*a*, 12*b*, 12*c* from the unporosified portion 14 of the silicon substrate 2, lithium 20 is intercalated in the detached porous silicon layers 12*a*, 12*b*, 12*c* (cf. FIG. 7).

FIG. 7 shows a sectional view of a working example of an inventive electrode 21 for a battery designed as a rollable film.

This electrode 21 is formed by the porous silicon layers 12*a*, 12*b*, 12*c*, the copper layer 15, and by the lithium 20 intercalated in the porous silicon layers 12*a*, 12*b*, 12*c*.

The installation of the electrode 21 in a battery is followed by activation of the electrode 21 by performing a plurality of charge-discharge cycles on the battery.

Figure 8:
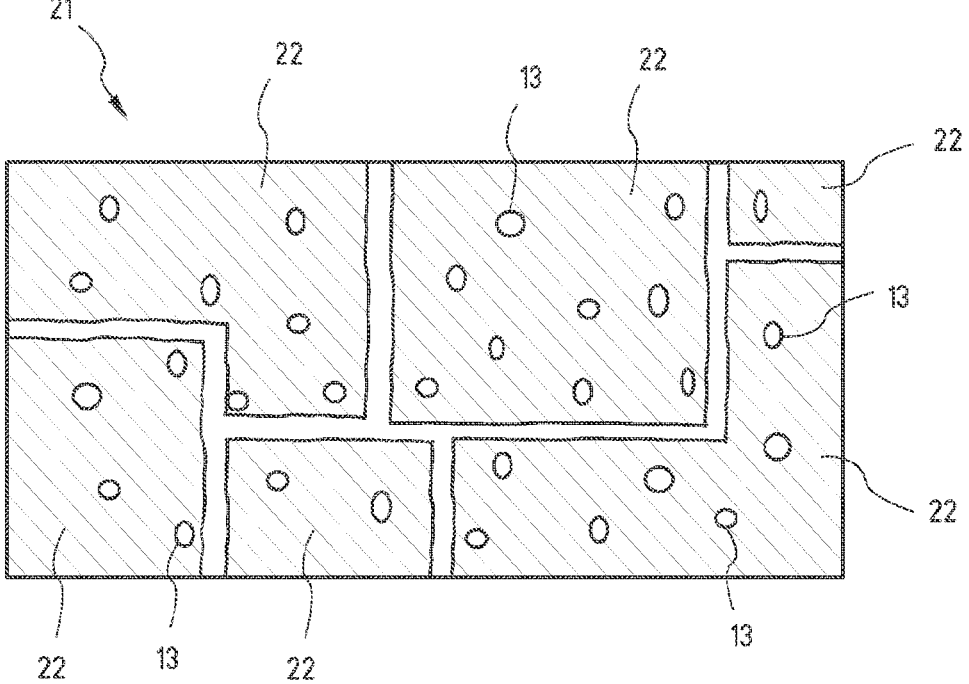
FIG. 8 shows a sectional view of one of the porous silicon layers of the electrode from FIG. 7 after activation of the electrode.

The activation of the electrode 21 results in the formation of an island structure in the porous silicon layers 12*a*, 12*b*, 12*c* that does not develop further after a few cycles and remains largely stable over further cycles (cf. FIG. 8). If the silicon of the electrode 21 were non-porous, the electrode 21 would be destroyed during performance of the charge-discharge cycles as a consequence of disordered recrystallization of the silicon. However, in the present case, the porous structure of the silicon results in a self-organized recrystallization of the silicon wherein the portions of the silicon that are embedded in the copper layer 15 serve as seed crystals.

FIG. 8 shows a sectional view of one of the porous silicon layers 12*a*, 12*b*, 12*c* of the electrode 21 from FIG. 7 after activation of the electrode 21.

The island structure of the depicted porous silicon layer, which is formed from a plurality of rectangular regions 22, can be seen in FIG. 8.

Unlike the pores 13 in the porous silicon layer depicted in FIG. 8, the lithium 20 intercalated in the depicted porous silicon layer is in FIG. 8 omitted for better clarity.

In an alternative working example, in contrast to the first working example described above in connection with FIGS. 1 to 8, a copper layer is by means of an alternative process variant deposited on a multilayer system that corresponds to the multilayer system 11 described in connection with FIG. 2. In this alternative process variant, instead of the first portion 16 of the copper layer 15, a nickel layer is in a first deposition step deposited on the multilayer system. The deposition of the nickel layer on the multilayer system is effected by means of electrochemical deposition. In order to deposit the nickel layer on a silicon substrate having the multilayer system on the substrate underside, the silicon substrate is wetted on the substrate underside with a deposition solution comprising nickel sulfate or nickel sulfamate and an electric current is applied.

The deposition of the nickel layer can be illustrated by FIG. 4. In the representation thereof, the reference numeral 16 would in this alternative working example refer to the nickel layer. In all other respects, the elements of the alternative working example would correspond to the elements shown in FIG. 4.

In a second deposition step following the deposition of the nickel layer, a copper layer is in the alternative working example deposited on the nickel layer by means of electrochemical deposition. The nickel layer serves here as an electrically conductive seed layer for the formation of the copper layer and provides improved adhesion on the porous silicon layer of the copper layer applied onto the nickel layer. For illustration of the deposition of the copper layer on the nickel layer, reference can be made to FIG. 5. In the representation thereof, the reference numeral 16 would in this alternative working example refer to the nickel layer and the reference numeral 17 to the copper layer deposited on the nickel layer.

The facts and features described below in connection with FIGS. 9 to 14 refer to the working example shown in FIGS. 1 to 8. Unless otherwise stated, they may also be combined without restriction with the alternative working example described above.

Figure 9:
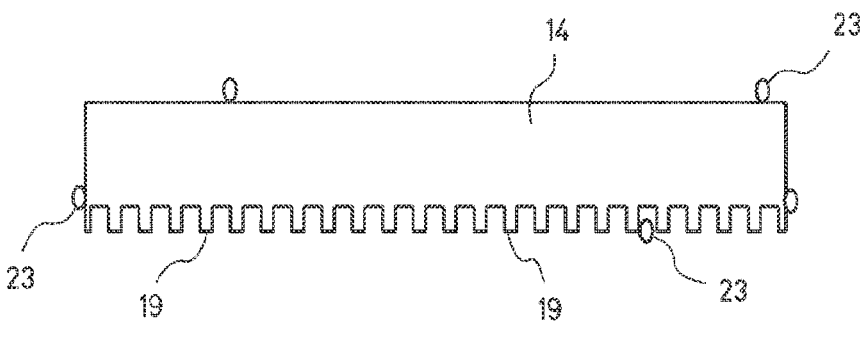
FIG. 9 shows, in a side view, the unporosified portion of the silicon substrate and the metal residues and remnants of porous structures present on the unporosified portion of the silicon substrate.

FIG. 9 shows, in a side view, the unporosified portion 14 of the silicon substrate 2.

Also shown in FIG. 9 are the remnants of porous structures adjoining the unporosified portion 14 of the silicon substrate 2, which are formed by slender stumps 19, and also the metal residues 23 present on the unporosified portion 14 of the silicon substrate 2, with which the unporosified portion 14 of the silicon substrate 2 will, on deposition of the copper layer 15 according to the first working example described in connection with FIGS. 1 to 8 or on deposition of the nickel layer and of the copper layer according to the alternative working example, be contaminated.

Figure 10:
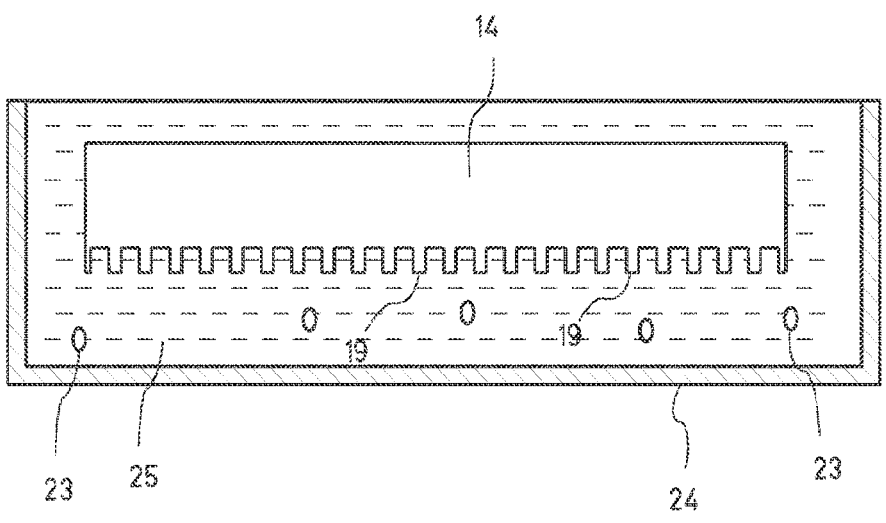
FIG. 10 shows the unporosified portion of the silicon substrate during removal of the metal residues in a treatment tank.

In order to be able to recycle the unporosified portion 14 of the silicon substrate 2, the stumps 19 and the metal residues 23 are removed in a two-stage wet-chemical etching process (cf. FIGS. 9 and 10). This allows the unporosified portion 14 of the silicon substrate 2 to be used for example for production of a further electrode of the type described above, especially through repetition of the process steps described above.

FIG. 10 shows the unporosified portion 14 of the silicon substrate 2, the adjoining stumps 19, said metal residues 23, and a treatment tank 24.

The treatment tank 24 is filled with an acidic etching medium 25 that serves for the removal of the metal residues 23 in the form of copper in the case of the first working example or in the form of copper and nickel in the case of the alternative working example. The etching medium 25 may for example comprise hydrogen fluoride and/or hydrogen chloride and/or nitric acid and/or sulfuric acid and/or hydrogen peroxide and/or ozone.

Depicted in FIG. 10 is a state in which the unporosified portion 14 of the silicon substrate 2 is immersed in the etching medium 25 and said metal residues 23 have dissolved in the etching medium 25.

Figure 11:
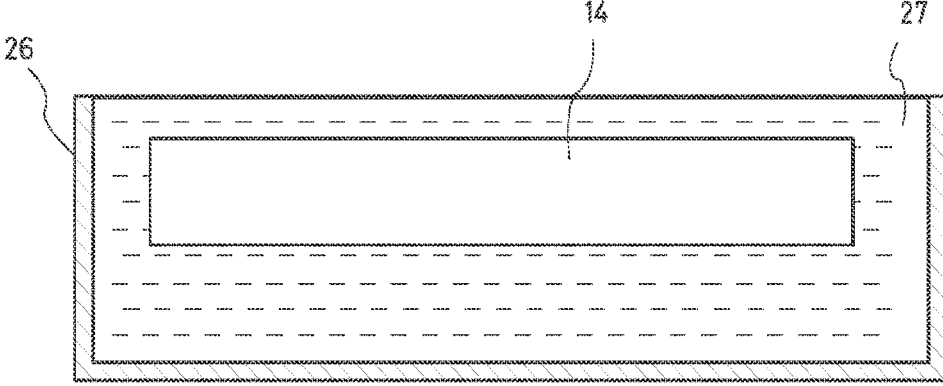
FIG. 11 shows the unporosified portion of the silicon substrate after removal of the metal residues, in which the unporosified portion of the silicon substrate is present in a further treatment tank for removal of remnants of porous structures.

FIG. 11 shows the unporosified portion 14 of the silicon substrate 2 and a further treatment tank 26.

The treatment tank 26 from FIG. 11 is filled with an etching medium 27 that serves for the removal of the stumps 19 mentioned above. This etching medium 27 may be an alkaline etching medium or an acidic etching medium. In the former case, the etching medium 27 may for example comprise deionized water and also sodium hydroxide and/or potassium hydroxide. In the latter case, the etching medium 27 may for example comprise hydrogen fluoride and/or nitric acid and/or sulfuric acid and/or hydrogen peroxide and/or ozone.

Depicted in FIG. 11 is a state in which the unporosified portion 14 of the silicon substrate 2 is immersed in the etching medium 27 present in the treatment tank 26. The etching medium 27 brings about a surface polishing of the silicon substrate 2, resulting in this state in removal of the stumps 19 described above from the unporosified portion 14 of the silicon substrate 2 and allowing the unporosified portion 14 of the silicon substrate 2 to be used for further production of an electrode of the type described above.

Figure 12:
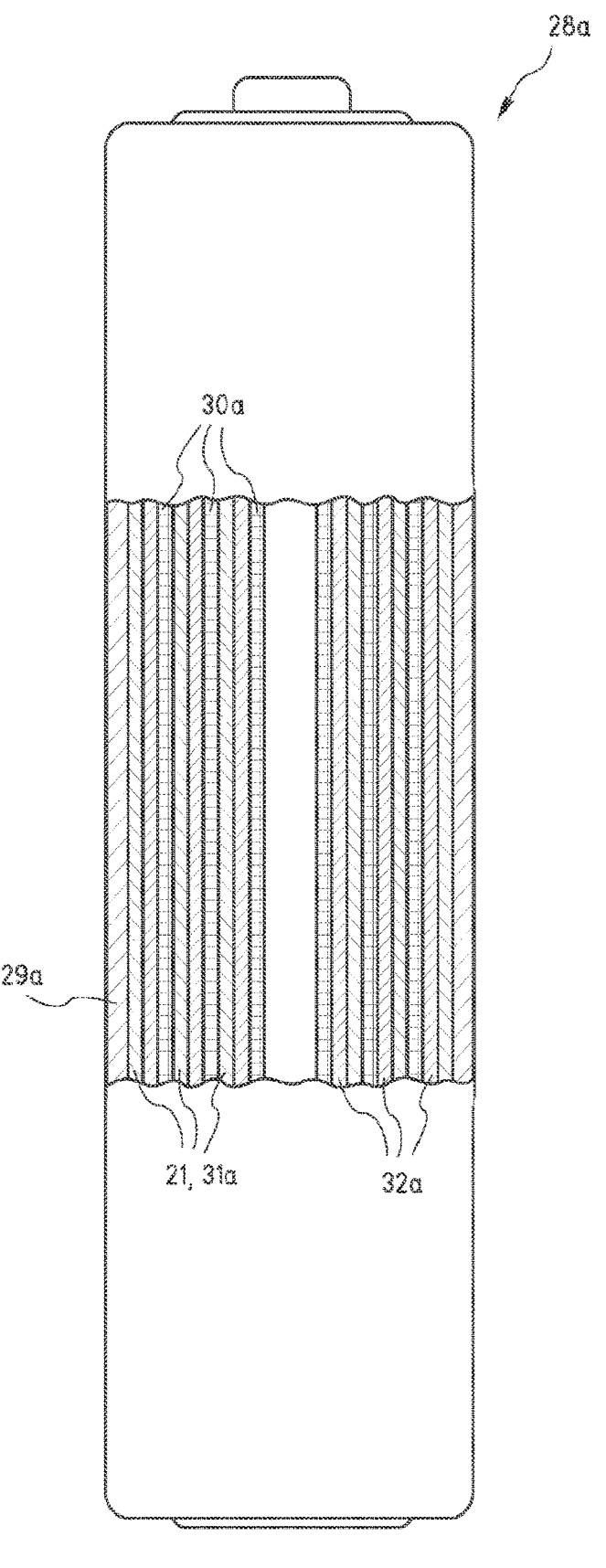
FIG. 12 shows, in a partial sectional view, a lithium-ion battery equipped with the electrode from FIG. 7.

FIG. 12 shows, in a partial sectional view, a working example of an inventive battery 28*a*.

The battery 28*a* is in the present working example a lithium-ion battery in a cylindrical construction.

The battery 28*a* comprises a cylindrical housing 29*a*. In addition, the battery 28*a* comprises a cathode 30*a*, an anode 31*a*, and also a separator 32*a* arranged between the cathode 30*a* and the anode 31*a*. The cathode 30*a*, the anode 31*a*, and the separator 32*a* are each formed as a rolled-up film and are arranged in the housing 29*a* of the battery 28*a*.

The anode 31*a* of the battery 28*a* is the electrode 21 described above (cf. FIGS. 7 and 8). That is to say, the electrode 21 described above is used as the anode 31*a* in the battery 28*a*.

Figure 13:
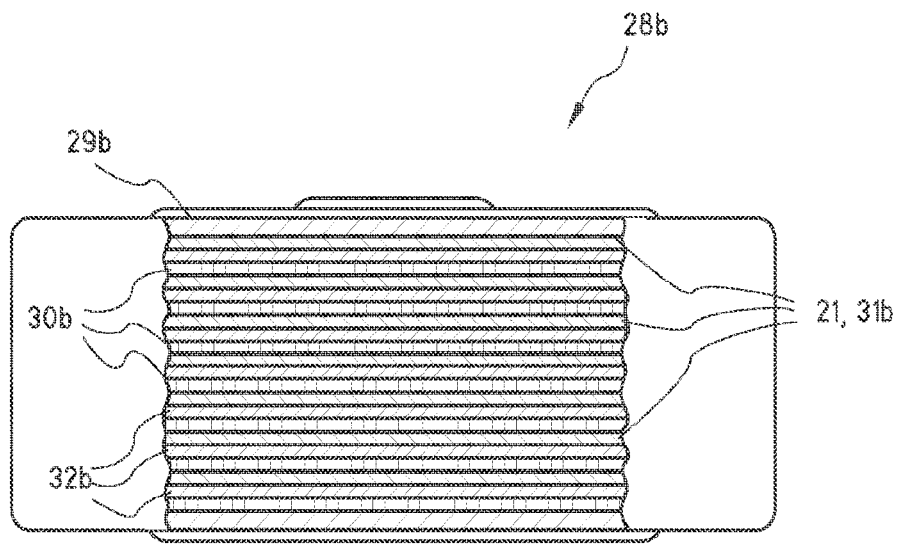
FIG. 13 shows an alternative construction of a battery with the electrode from FIG. 7.

FIG. 13 shows, in a partial sectional view, an alternative working example of the battery described in connection with FIG. 12. In the working example shown in FIG. 13, the battery 28*b* has an alternative construction with a rectangular base.

The battery 28*b* comprises in the alternative construction a cuboidal housing 29*b*. In addition, the battery 28*b* comprises a cathode 30*b*, an anode 31*b*, and also a separator 32*b* arranged between the cathode 30*b* and the anode 31*b*. The cathode 30*b*, the anode 31*b*, and the separator 32*b* are formed as rectangular sections and arranged stacked on top of one another in predefine order inside the housing 29*b* of the battery 28*b*.

The anode 31*b* of the battery 28*b* is the electrode 21 described above (cf. FIGS. 7 and 8). That is to say, the electrode 21 described above is used as the anode 31*b* in the battery 28*b* in the form of rectangular sections.

Figure 14:
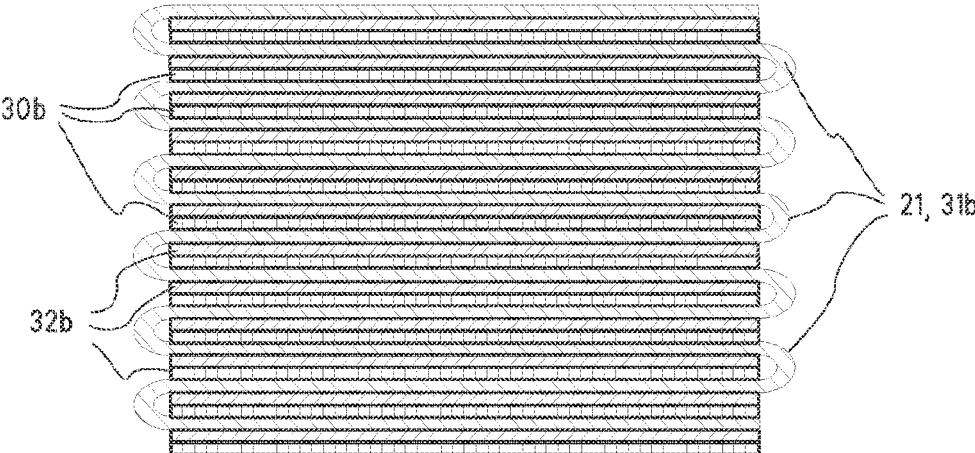
FIG. 14 shows an alternative possible arrangement of the electrode from FIG. 7.

FIG. 14 shows an alternative possible arrangement of the cathode 30*b*, the anode 31*b*, and the separator 32*b* in the form of a cuboidal stack for the alternative working example of the battery 28*b* described in connection with FIG. 13. The anode 31*b* here is formed as a foldable film. In this alternative possible arrangement, the cathode 30*b* and the separator 32*b* are folded between the anode 31*b* by means of a Z-folding technique. The cathode 30*b* and the separator 32*b* may here be formed as rectangular sections in a pairwise manner. Preferably, the cathode 30*b* and the separator 32*b* are formed as a foldable film. This allows an overlaid Z-folding technique to be applied. With this it is possible in alternate folding steps for the anode 31*b*, the cathode 30*b*, and the separator 32*b* to be folded into a cuboidal stack. For example, the cathode 30*b* and the separator 32*b* can in a first folding step be folded between the anode 31*b*. In a second folding step, the anode 31*b* can then be folded between the separator 32*b* that is arranged in a pairwise manner with the cathode 30*b*. After the second folding step, the first folding step can be executed afresh. This makes it possible to produce a battery 28*b* having a cuboidal construction at low cost and/or in an automated manner.

The invention has been described in detail with reference to the depicted working examples. However, the invention is not limited to or by the disclosed example. Other variants may be derived from this working example by those skilled in the art, without departing from the ideas underlying the invention.

LIST OF REFERENCE NUMERALS

1 Treatment device
2 Silicon substrate
3 Transport device
4 Direction of transport
5 Transport roller
6 Treatment tank
7 Etching medium
8 Electrode
9 Substrate underside
10 Gas stream
11 Multilayer system
12*a* Porous silicon layer
12*b* Porous silicon layer
12*c* Porous silicon layer
12*d* Porous silicon layer
13 Pore
14 Unporosified portion of the silicon substrate
15 Copper layer
16 First portion of the copper layer
17 Second portion of the copper layer
18 Thermal radiation
19 Stumps
20 Lithium
21 Electrode
22 Rectangular region
23 Metal residue
24 Treatment tank
25 Etching medium
26 Treatment tank
27 Etching medium
28*a* Battery
28*b* Battery
29*a* Housing
29*b* Housing
30*a* Cathode
30*b* Cathode
31*a* Anode
31*b* Anode
32*a* Separator
32*b* Separator

The invention claimed is:

1. A process for producing an electrode having at least one porous silicon layer and a copper layer on the at least one porous silicon layer, the process comprising:

etching a silicon substrate for forming at least one porous silicon layer; and depositing a copper layer on the at least one porous silicon layer;

wherein the electrode is configured for a lithium-ion battery; and etching the silicon substrate to form a multilayer system made up of a plurality of porous silicon layers that differ from one another in a quality of the porous silicon layers selected from the group consisting of porosities, pore sizes, and pore shapes, and wherein the at least one porous silicon layer is one of the plurality of porous silicon layers of the multilayer system.

2. The process according to claim 1, wherein etching the silicon substrate comprises etching the silicon substrate wet-chemically.

3. The process according to claim 2, which comprises etching the silicon substrate in a continuous process.

4. The process according to claim 1, wherein etching the silicon substrate comprises etching the silicon substrate on one side.

5. The process according to claim 1, wherein etching the silicon substrate comprises etching the silicon substrate electrochemically, by:

transporting the silicon substrate along a direction of transport through a plurality of treatment tanks arranged one after the other in the direction of transport, each of the treatment tanks being filled with an etching medium and each having an electrode arranged therein;

during transport through the treatment tanks, contacting the silicon substrate on a substrate underside with the etching medium present in the respective treatment tank; and wherein a polarity of the electrodes arranged in the treatment tanks alternates in the direction of transport.

6. The process according to claim 1, which comprises depositing the copper layer in a two-stage process including:

a first deposition step wherein a first portion of the copper layer is deposited on the at least one porous silicon layer by galvanic displacement; and a second deposition step wherein a second portion of the copper layer is deposited on the first portion of the copper layer by electrochemical deposition.

7. The process according to claim 1, which comprises:

a first deposition step in which a nickel layer is deposited on the at least one porous silicon layer by electrochemical deposition; and a second deposition step in which the copper layer is deposited on the nickel layer by electrochemical deposition.

8. The process according to claim 1, which comprises:

forming the multilayer system with the porous silicon layer of the multilayer system having a greatest porosity immediately adjoining an unporosified portion of the silicon substrate.

9. The process according to claim 1, which comprises removing the at least one porous silicon layer together with the copper layer from an unporosified portion of the silicon substrate.

10. The process according to claim 9, wherein removing the at least one porous silicon layer together with the copper layer comprises subjecting the silicon substrate to a thermal treatment.

11. The process according to claim 10, which comprises treating the silicon substrate in a continuous oven.

12. The process according to claim 9, which comprises intercalating lithium in the at least one porous silicon layer after the at least one porous silicon layer has been removed together with the copper layer from the unporosified portion of the silicon substrate.

13. The process according to claim 1, which comprises integrating the electrode as an anode in a battery.

14. An electrode having at least one porous silicon layer and a copper layer on the at least one porous silicon layer, comprising:

an etched silicon substrate forming at least one porous silicon layer;

a copper layer deposited on the at least one porous silicon layer;

the electrode being configured for a lithium-ion battery; and a plurality of porous silicon layers forming a multilayer system arranged on top of one another and differing from one another in a quality selected from the group consisting of porosities, pore sizes, and pore shapes, and wherein said at least one porous silicon layer is one of said plurality of porous silicon layers of said multilayer system.

15. The electrode according to claim 14, wherein the electrode is configured as a foil.

16. The electrode according to claim 14, wherein the electrode is configured as a rollable film.

17. The electrode according to claim 14, which comprises lithium intercalated in said at least one porous silicon layer.

18. The electrode according to claim 14, configured for a lithium-ion battery.

* * * * *